United States Patent
Nilsson et al.

(10) Patent No.: US 10,104,959 B2
(45) Date of Patent: Oct. 23, 2018

(54) CABINET

(71) Applicant: Elfa International AB, Vastervik (SE)

(72) Inventors: Peter Nilsson, Vastervik (SE); Rolf Henriksson, Ankarsrum (SE)

(73) Assignee: Elfa International AB, Vastervik (SE)

( * ) Notice: Subject to any disclaimer, the term of this patent is extended or adjusted under 35 U.S.C. 154(b) by 0 days.

(21) Appl. No.: 15/531,929

(22) PCT Filed: Nov. 30, 2015

(86) PCT No.: PCT/EP2015/078029
§ 371 (c)(1),
(2) Date: May 31, 2017

(87) PCT Pub. No.: WO2016/087354
PCT Pub. Date: Jun. 9, 2016

(65) Prior Publication Data
US 2017/0311717 A1    Nov. 2, 2017

(30) Foreign Application Priority Data

Dec. 1, 2014 (EP) .................................. 14195608

(51) Int. Cl.
*A47B 47/00* (2006.01)
*A47B 47/02* (2006.01)
(Continued)

(52) U.S. Cl.
CPC ............ *A47B 47/025* (2013.01); *A47B 57/16* (2013.01); *A47B 95/008* (2013.01); *E05D 15/06* (2013.01);
(Continued)

(58) Field of Classification Search
CPC ..... A47B 47/025; A47B 57/16; A47B 95/008; E05D 15/16
See application file for complete search history.

(56) References Cited

U.S. PATENT DOCUMENTS 3,295,902 A     1/1967  Oliver
4,013,254 A *   3/1977  Boundy ................. A47B 57/42
                                                  211/107
(Continued)

FOREIGN PATENT DOCUMENTS

FR      2078917 A5   11/1971
JP      H09-149830 A   6/1997
WO      00/56188 A1    9/2000

OTHER PUBLICATIONS

International Search Report and Written Opinion received in Patent Cooperation Treaty Application No. PCT/EP2015/078029, dated Feb. 15, 2016, 9 pages.

*Primary Examiner* — Daniel J Rohrhoff
(74) *Attorney, Agent, or Firm* — Hubbard Johnston, PLLC

(57) ABSTRACT

The present disclosure relates to a cabinet adapted to be suspended from vertically oriented carrier elements (11, 13), provided with slots (15). The cabinet has a top (3) and bottom panels (5), as well as first and second side panels (7,9). The side panels comprise rear connector elements (31) for connecting to carrier element slots at the rear of the cabinet, and the top panel comprise connector elements (33) connecting the front corners of the top panel to the front end of a side panel. Thereby a cabinet can be readily assembled by an end user.

21 Claims, 5 Drawing Sheets

(51) Int. Cl.
  *A47B 95/00* (2006.01)
  *F16B 12/50* (2006.01)
  *E05D 15/06* (2006.01)
  *A47B 57/16* (2006.01)

(52) U.S. Cl.
  CPC ......... *F16B 12/50* (2013.01); *E05Y 2900/208* (2013.01)

(56) References Cited

U.S. PATENT DOCUMENTS

| | | | | |
|---|---|---|---|---|
| 4,826,115 | A * | 5/1989 | Novitski | A47B 57/42 248/224.8 |
| 5,221,131 | A * | 6/1993 | Lesperance | A47B 47/025 312/263 |
| 2007/0231595 | A1 * | 10/2007 | Tamaddoni-Jahromi | C23C 4/02 428/663 |
| 2010/0289392 | A1 * | 11/2010 | DeWeerd | A47B 57/16 312/245 |
| 2017/0129411 | A1 * | 5/2017 | Beere | B60R 7/08 |
| 2017/0311717 | A1 * | 11/2017 | Nilsson | A47B 47/025 |

\* cited by examiner

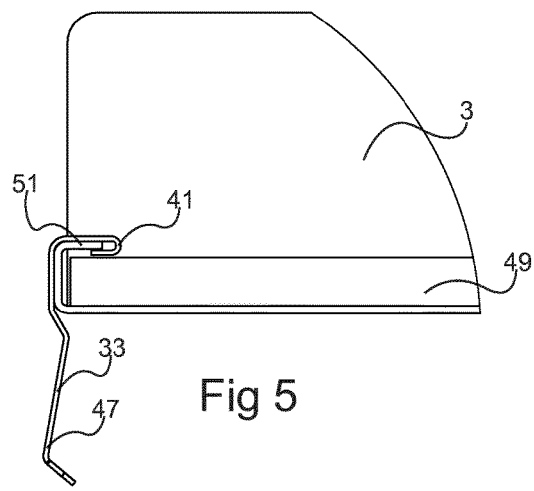
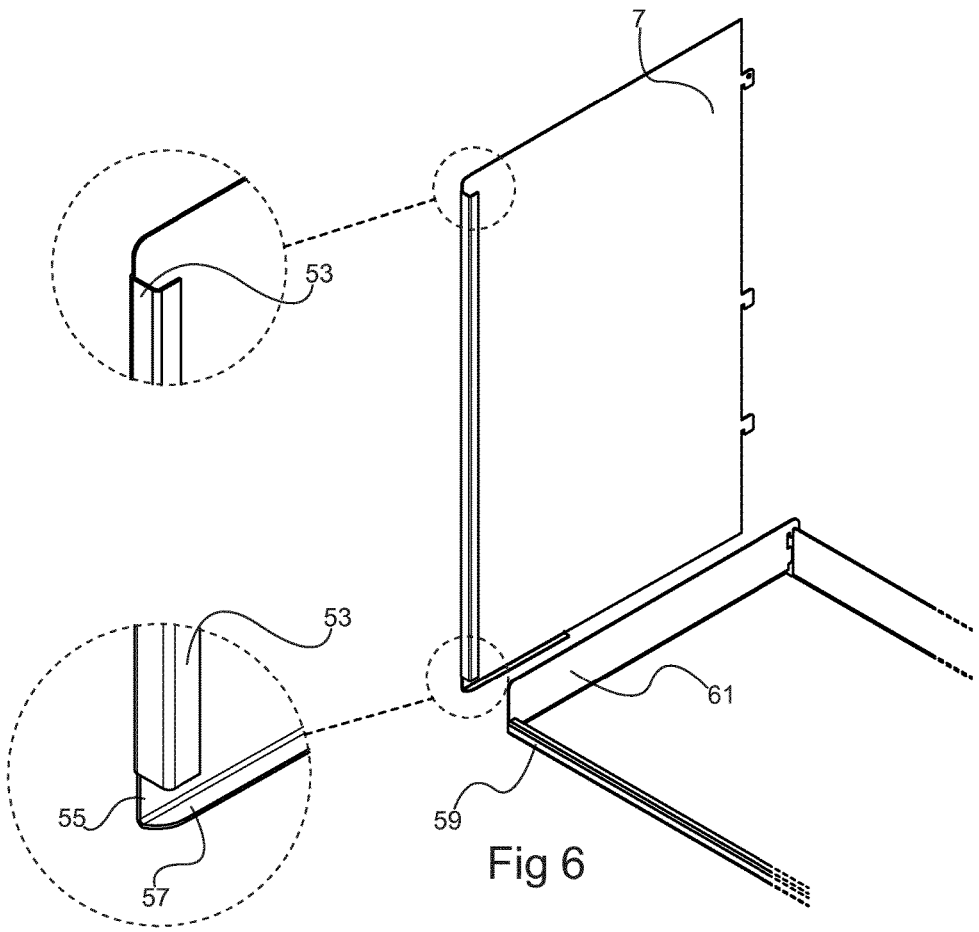

CABINET

RELATED APPLICATION

This application, a national phase application of PCT/EP2015/078029, filed Nov. 30, 2015, claims priority to European Application No. 14195608.6 filed Dec. 1, 2014.

TECHNICAL FIELD

The present disclosure relates to a cabinet comprising a top panel, a bottom panel, and first and second side panels, wherein the cabinet is adapted to be suspended from vertically oriented carrier elements which are provided with slots.

BACKGROUND

Such a cabinet is disclosed in JP-9-149830. That cabinet requires the side panels to be attached by means of screws to the top and bottom panels, and in the case of the top panels via intervening brackets.

One problem with cabinets of the previously disclosed kind is that they are relatively complicated to assemble for an end user, and that this process may be time consuming.

SUMMARY OF THE INVENTION

One object of the present disclosure is therefore to provide a cabinet of the initially mentioned kind that can easily and quickly be assembled by an end user.

This object is achieved by a cabinet as defined in claim 1. More specifically, in a cabinet of the initially mentioned kind, the side panels comprise rear connector elements that connect to carrier element slots at the rear of the cabinet, and the top panel has connector elements connecting the front corners of the top panel to the front end of a side panel. This means that an end user can fit the side panels simply by attaching them to the carrier elements and connecting their front corners to the upper panels. This is a comparatively easy process.

The side panels may made of sheet metal, and the rear connector elements may comprise hooks punched from the sheet metal.

The front edges of the side panels can comprise U-shaped folds that can be used to connect to the top panel corners as well as to the bottom panel corners.

The top panel's connector elements may comprise sheet metal clips which are adapted to be attached to the top panel, and which may be adapted to be inserted into the U-shaped folds of the side panels.

The side panels may further have flanges directed towards the centre line of the cabinet and extending under the bottom surface of the bottom panel.

The top panel may be made of sheet metal and can be reinforced with an MDF board. The top and bottom panels can be identical units which provides for efficient production.

Guiding profiles may be attached to the top and bottom panels for guiding sliding doors.

Optionally, the cabinet may comprise a back panel adapted to be attached to the carrier elements.

BRIEF DESCRIPTION OF THE DRAWINGS

FIG. 5 shows a side view of a mounting clip attached to a in a top panel.
FIG. 6 illustrates features of a sheet metal side panel.

DETAILED DESCRIPTION

Figure 1:
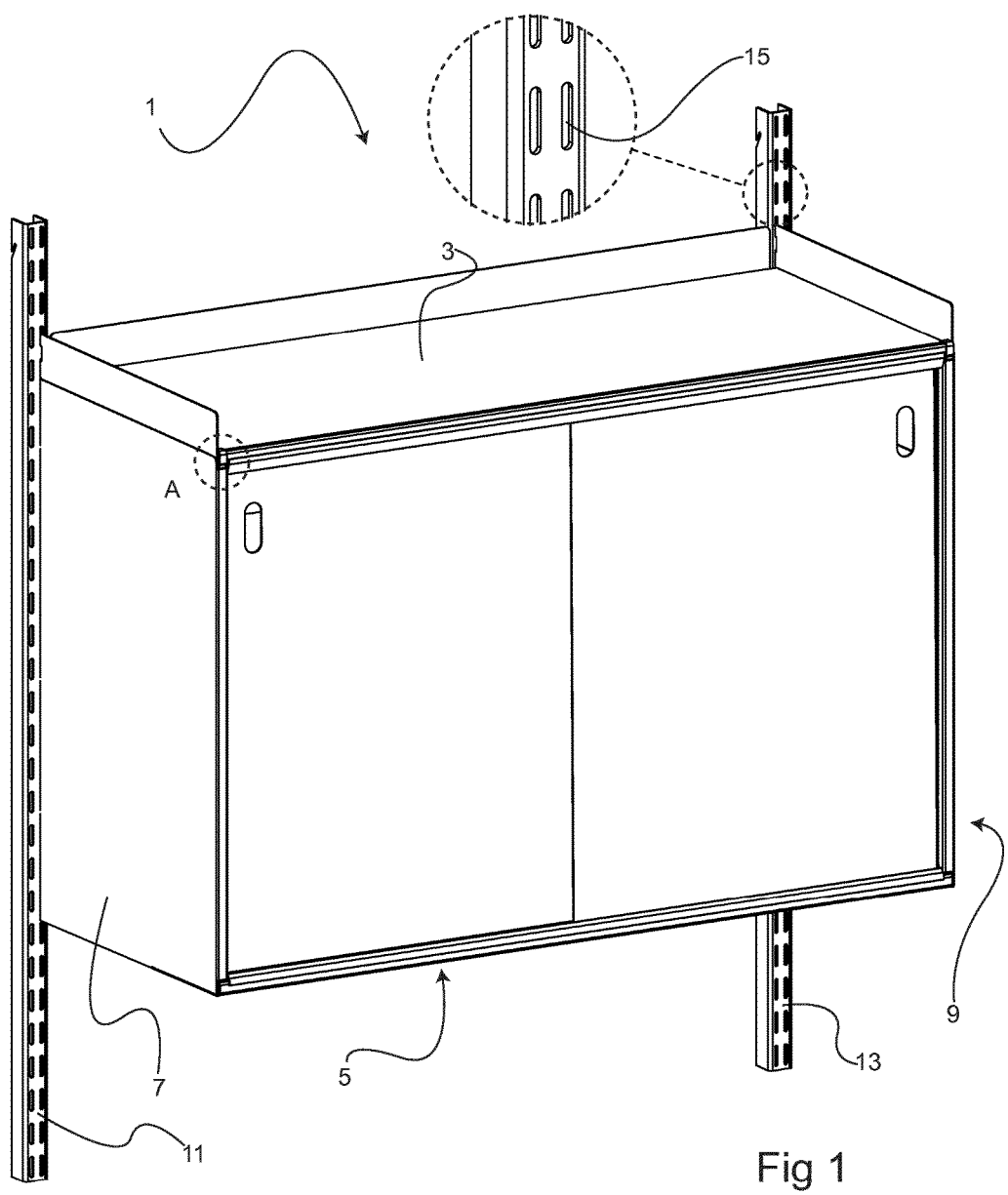
FIG. 1 shows a perspective view of an assembled cabinet.

The present disclosure relates to a cabinet, e.g. for use in an office, which cabinet can be readily assembled by an end user. The cabinet is intended to be suspended from two or more vertical carrier elements provided with slots that allow suspension of different supporting units at a chosen height/location. Such carrier elements have been used e.g. to suspend brackets that in turn carry shelves. By provision of vertical carrier elements, and a number of brackets, racks, and shelves, an end user can configure a storage system according to his or her needs. The present disclosure accomplishes a cabinet that can be used in this context. FIG. 1 shows a perspective view of an assembled cabinet 1.

The cabinet 1 has a top panel 3, a bottom panel 5 (hidden in FIG. 1), and first 7 and second 9 (hidden in FIG. 1) side panels. As illustrated, the cabinet is adapted to be suspended from first 11 and second 13 vertically oriented carrier elements which are provided with slots 15. The slots 15 are provided on each element in two rows, one of which is used on each carrier element 11, 13 to suspend the cabinet. The carrier elements in turn may be attached to a wall, or may be provided with feet in a free standing arrangement.

Figure 2:
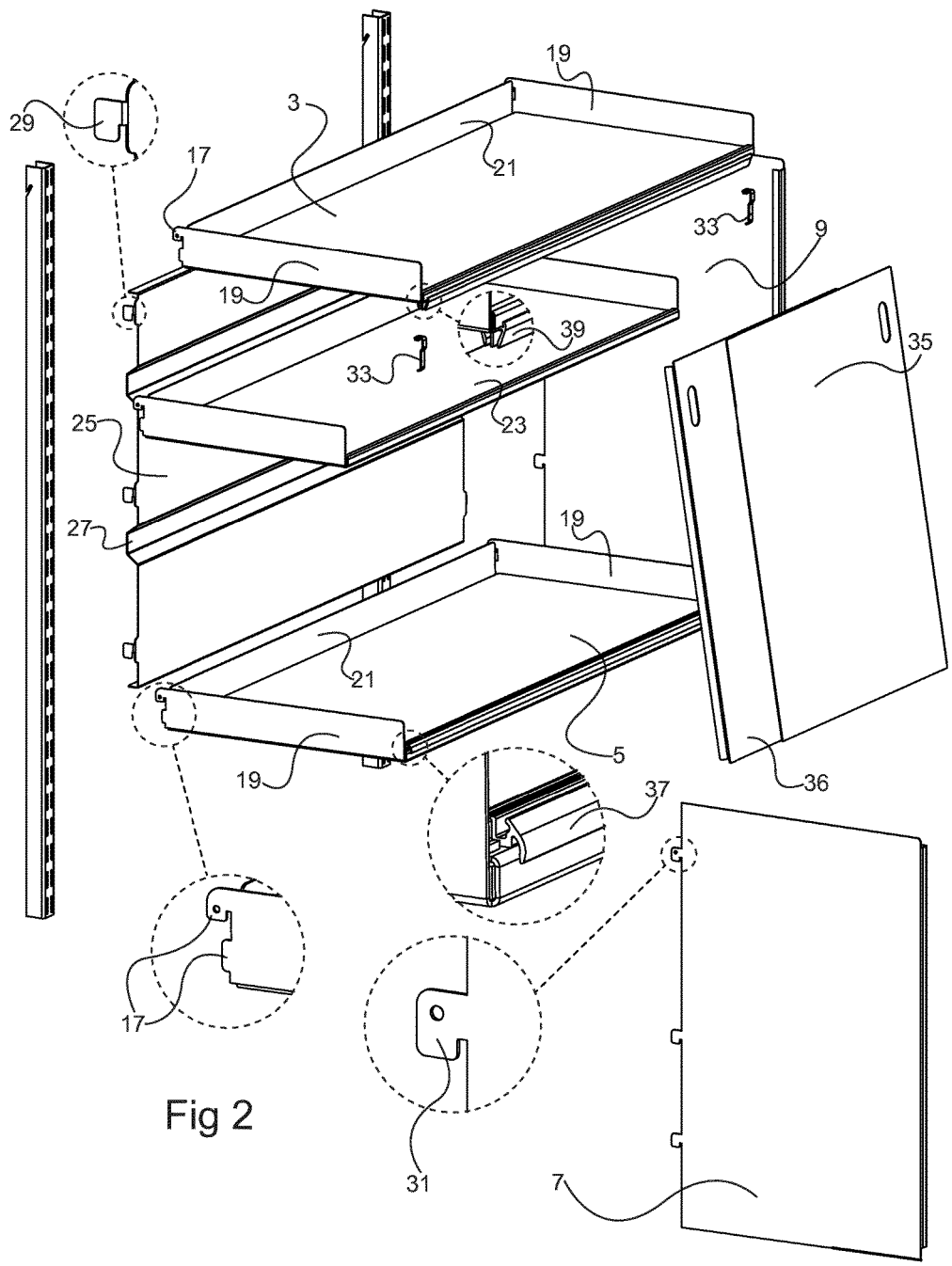
FIG. 2 shows an exploded view of the cabinet in FIG. 1.

FIG. 2 shows an exploded view of the cabinet in FIG. 1. The bottom panel 5, may be produced from a single piece of sheet metal, that is punched to provide means for interacting with the vertical carrier, such as hooks and tabs 17, and is folded to provide upstanding side 19 and rear 21 portions that provide the bottom panel with improved structural strength.

The top panel 3 may be provided in a similar or identical way from sheet metal with vertical carrier interaction means 17, and upstanding side 19 and rear 21 portions. Further, as will be shown later a board may be fitted in each of the top and bottom panels 3, 5 in order to provide additional stiffness.

FIG. 2 additionally shows an inner shelf 23, hidden in FIG. 1, that may be produced much in the same way as the top and bottom panels 3, 5. The top and bottom panels 3, 5, as well as the inner shelf 23, could be attached to the vertical carriers 11, 13 independently of each other and other parts of the cabinet, and could function as shelves. The following disclosure discusses how other elements are provided that provides a cabinet, the interior of which is concealed and protected e.g. from dust and the like.

To start with, a back panel 25 may be provided, although this is very much optional as the wall behind the carriers 11, 13 itself to some extent provides a back wall of a cabinet. If a back panel 25 is provided, it may be formed from sheet metal which is punched an bent to a form with folded ridges 27, that provide structural rigidity, and hooks/tabs 29 that allow the back panel to be attached to slots in the carriers 11, 13. As shown, the hooks/tabs may project somewhat to the sides of the back panel such that carrier element openings, not used by the back panel 25, are not obscured by the same and may be used by other parts of the cabinet.

Further, side panels 7, 9 may be provided that may connect both to the carrier elements 11, 13, and to the top and bottom panels 3, 5. The side panels 7, 9 may as well comprise connector elements 31 in the form of tabs/hooks for connecting to carrier element slots at the rear of the cabinet. Additionally, there may be provided connector elements 33, connecting the front corners of the top panel 3 to the front end of the side panels 7, 9, as well as connecting elements to the front corners of the bottom panel 5 as will be discussed in greater detail later.

Finally, cabinet doors 35, 36 may be provided that allows the cabinet to be shut. Such doors may be made from a thin board material, and may be slidably attached to the bottom and top panels by attaching plastic profiles 37, 39 with grooves, in which the doors can slide, thereto, as will be illustrated in greater detail later.

Figure 3:
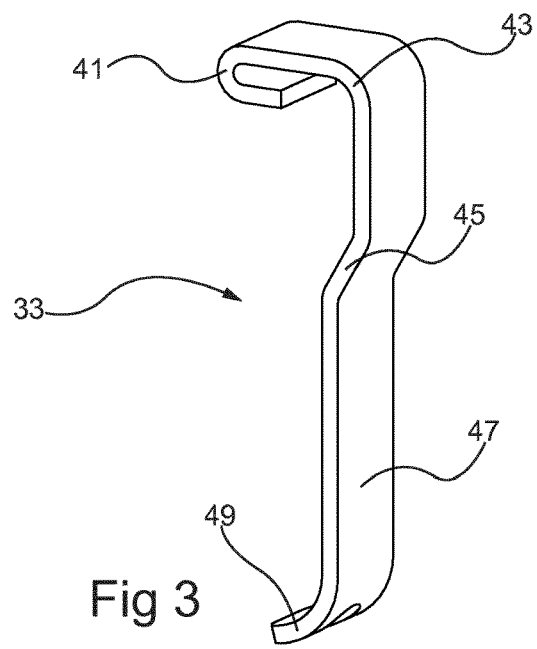
FIG. 3 illustrates a connector element in the form of a mounting clip.

FIG. 3 shows a connector element in the form of a mounting clip 33. Such a clip may be used at each top front corner of the cabinet in order to connect the top panel 3 to each side panel 7, 9, in such a way that the side panels become laterally fixed at this location. The mounting clip 33 may be made from a sheet metal strip, although a plastic clip could be considered as well, and may comprise an upper fold 41 in the form of a horizontally positioned "U", that is capable of clutching an edge of the upper panel's sheet metal plate, as will be illustrated later. An upper corner 43 of the clip follows the contour of the upper panel's 3 outer edge, and a transition portion 45 provides a parallel displacement inwards of the lower portion 47 of the clip such that it can readily be inserted into a fold in a side panel as will be shown later. A lower inward bend 49 of the clip facilitated this insertion and provides an improved structural strength as it is avoided that the lower part extends in one plane only.

Figure 4:
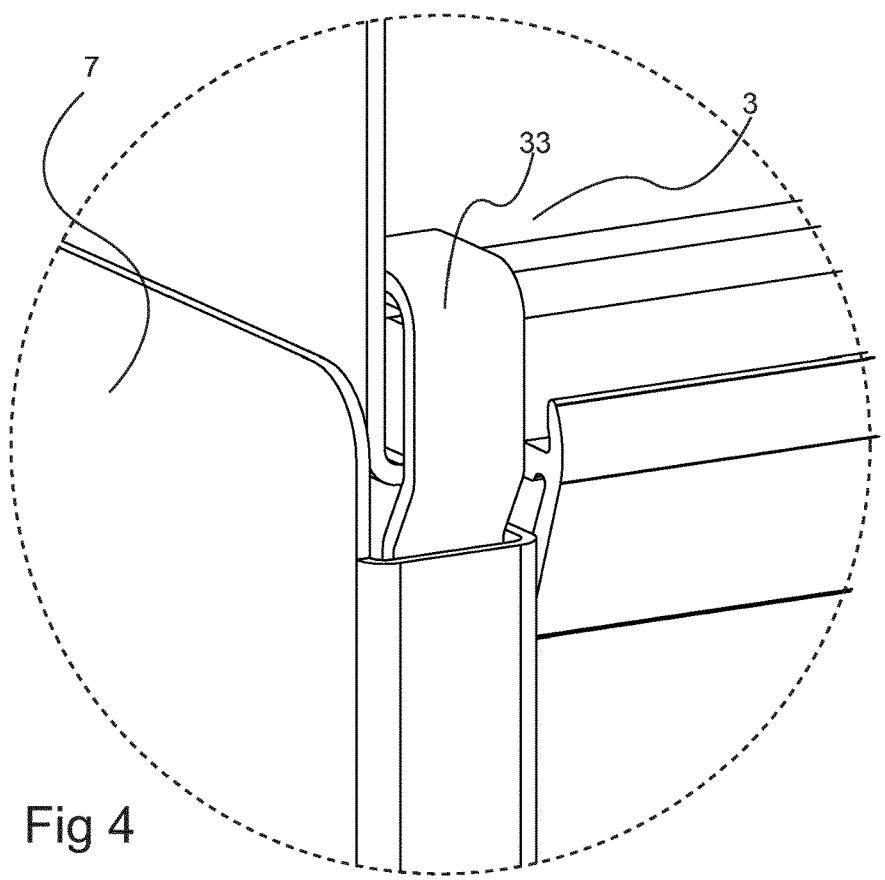
FIG. 4 shows a mounting clip inserted in a side panel, cf. A in FIG. 1.

FIG. 4 shows a mounting clip 33 inserted in a side panel 7. As illustrated, the lower portion of the clip (cf. 47, FIG. 3) is inserted in a folded front section of the side panel 7. The mounting clip 33 is further attached to the top panel 3 as is illustrated in FIG. 5, illustrating a side view of a mounting clip 33 attached to a top panel 3, shown in cross section.

In order to make the top panel more resistant to bending and to reduce e.g. clattering sounds when hard objects are placed on the top panel, a board 49, typically a coated MDF board, may be integrated in the top panel 3. The cut piece of sheet metal making up the remainder of the top panel 3 is then folded around the board 49, such that the front edge 51 becomes directed towards the rear of the cabinet. This edge is used to attach the upper fold 41 of the mounting clip 33, clutching the edge, as shown in FIG. 5.

The lower portion 47 of the clip is then inserted into a U-shaped fold 53 in the sheet metal side panel 7, shown in FIG. 6. Thereby, the upper front corner of the side panel 7 is prevented from moving sideways. The rear edge of the side panel 7 is firmly attached to the vertical carrier element and to the upper front edge to the top panel 3 in this way. Further, as will be shown, the bottom front corner of the side panel is connected to the bottom panel as will be disclosed. Thereby, a more stable cabinet structure is achieved.

As shown in FIG. 6, the U-shaped fold at the front of the side panel 7, folded towards the inner of the cabinet, may extend almost to the front bottom corner thereof, but as shown a free portion 55 may be left close to that corner. The bottom edge of the side panel 7 may comprise a flange 57 which is folded inwards, towards the centre of the cabinet. When the cabinet is assembled, that flange may extend a few millimetres under the bottom surface of the bottom panel 5, such that the bottom panel may partly rest on the flange 57. The bottom panel 5 may, similarly to the top panel, be made of a piece of sheet metal with an enclosed MDF board and a sheet metal side wall 61 may rise at each side of the bottom panel. The aforementioned free portion 55 at the front bottom corner of the side panel may be high enough to accommodate the front edge 59 of the bottom panel, including e.g. the board and optionally any profiles utilised to guide cabinet doors as will be discussed. Then, when assembled, the side wall 61 is adjacent to and in contact with the side panel 7, and a channel is formed between the front of the side wall 61 and the inner leg of the side panel's U-shaped fold 53. A connecting element in the form of a spacer may be fitted in that channel and then fixes the lower front corner of the side panel 7 to a front corner of the bottom panel.

Figure 7:
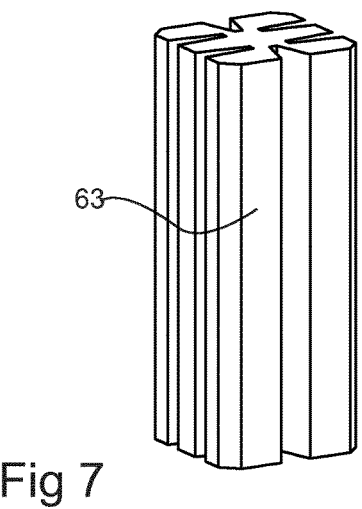
FIG. 7 illustrates a spacer used to connect the front lower corner of a side wall to a bottom panel front corner.
Figure 8:
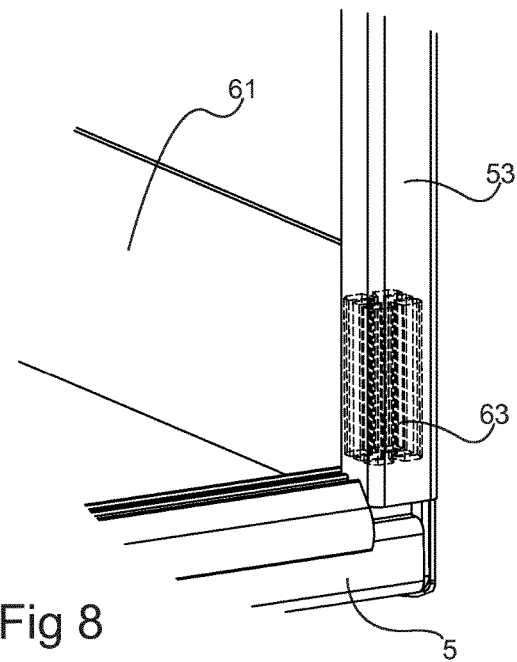
FIG. 8 illustrates positioned spacer.

An example of such a spacer 63 is shown in FIG. 7. The spacer 63 can be made of a bent strip of sheet metal, or as in the illustrated case from injection moulded rubber. Any shape that is suitable for filling the space between the legs of the U-shaped fold 53 and keeping the bottom part side wall 61 pressed against the side panel 7 can be considered. In this way, the side panels become fixed both at their rear side and at their front corners thereby accomplishing a sturdy cabinet readily and quickly assembled by an end user. FIG. 8 shows an example where the spacer 63 fills the U-shaped fold 53 wedging the side wall 61 of the bottom panel 5 fixed in contact with the side panel 7.

Figure 9:
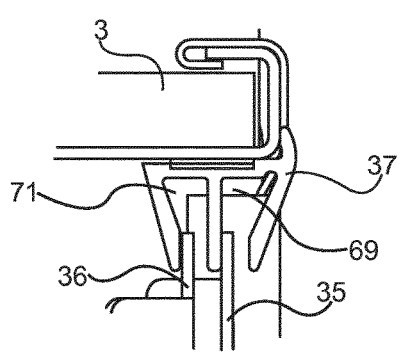
FIG. 9 shows a side view of a plastic profile attached to a top panel.
Figure 10:
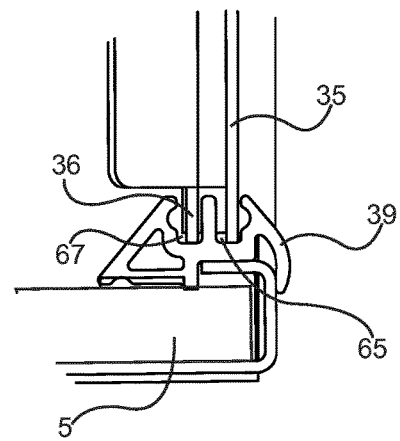
FIG. 10 shows a side view of a plastic profile attached to a bottom panel.

In order to add sliding doors 35, 36 to the cabinet, guiding profiles may be attached to the top and bottom panels. FIG. 9 shows a side view of a plastic profile 37 attached to a top panel 3, and FIG. 10 shows a side view of a plastic profile 39 attached to a bottom panel 5. As shown in FIG. 9, the guiding profile 37 of the top panel 3 may be glued, or even more conveniently attached with double sided tape, to a lower surface of the top panel, close to the front edge thereof. In the same way, the guiding profile 39 of the bottom panel 5 may be attached to the latter's top surface, close to the front edge thereof. The lower guiding profile 39 will carry the weight of each door 35, 36, each one in a respective groove 65, 67 in the profile 39. The upper guide profile 37 need only support the doors 35, 36 laterally as seen in the longitudinal direction of the profile. Each door is placed in a respective groove 69, 71 in the profile 37, and a gap of a few millimetres are provided above each door to make installation easier.

With the above described parts, the end user can very easily assemble a cabinet as follows. With reference to FIG. 2 a back panel 25 is first attached to the vertical carriers 13, and then a top 3 and a bottom panel is attached to the carriers above and below the back panel, respectively. Side panels 7 are then attached to the carriers 13, the lower edge flanges of the side panels reaching in beneath the bottom panel 5. A spacer is placed in the U-shaped fold of each side panel and wedging the lower panel side wall in that fold. A mounting clip 33 is attached at each side of the top panel close to its corners, and the front of the top panel is lifted slightly, such that the mounting clips can be inserted into the U-shaped folds of the side panels.

If desired, an inner shelf 23, optionally with a smaller depth, can be attached to the carriers as well.

Finally the guide profiles 37, 39 are fastened on the bottom and top panels. And doors 35, 36 are each first inserted into a groove in the top profiles and are then allowed to enter the corresponding groove in the bottom panel's profile. Thereby the cabinet is finished and may be used. Needless to say, the use of doors is optional.

The present disclosure is not limited to the illustrated example and may be varied and altered in different ways within the scope of the appended claims.

The invention claimed is:

1. A cabinet comprising
a top panel with front corners;
a bottom panel; and
first and second side panels;
wherein
the cabinet is adapted to be suspended from vertically oriented carrier elements, which are provided with slots;
each of the first and second side panels comprises rear connector elements for connecting to carrier element slots; and
the top panel comprises connector elements connecting the front corners of the top panel to front ends of the first and second side panels;
wherein the top panel and the bottom panel each have upstanding side and rear portions and rear connectors for connecting to the carrier element slots.

2. A cabinet according to claim 1, wherein the first and second side panels are made of sheet metal, and the rear connector elements comprise hooks punched from the sheet metal.

3. A cabinet according to claim 2, wherein front edges of the first and second side panels comprise U-shaped folds.

4. A cabinet according to claim 2, wherein each of the first and second side panels comprise flanges directed towards a center line of the cabinet and extending under a bottom surface of the bottom panel.

5. A cabinet according to claim 4, wherein the top and bottom panels are identical units.

6. A cabinet according to claim 2, further comprising guiding profiles attached to the top and bottom panels for guiding sliding doors.

7. A cabinet according to claim 1, further comprising guiding profiles attached to the top and bottom panels for guiding sliding doors.

8. A cabinet according to claim 1, wherein the top panel is made of sheet metal and reinforced with a board.

9. A cabinet according to claim 1, further comprising a back panel adapted to be attached to the carrier elements.

10. A cabinet according to claim 1, wherein the top and bottom panels are identical units.

11. A cabinet according to claim 1, wherein the top panel and the bottom panel are each formed of a single sheet of metal punched to form the connectors and folded to form the side and rear portions.

12. A cabinet comprising
a top panel with front corners;
a bottom panel; and
first and second side panels;
wherein
the cabinet is adapted to be suspended from vertically oriented carrier elements, which are provided with slots;
the each of the first and second side panels comprises rear connector elements for connecting to carrier element slots; and
the top panel comprises connector elements connecting the front corners of the top panel to front ends of the first and second side panels;
wherein the top panel's connector elements comprise clips which are adapted to be attached to the top panel.

13. A cabinet according to claim 12, wherein the first and second side panels are made of sheet metal and have front edges comprising U-shaped folds, and the clips have a portion adapted to be inserted into said U-shaped folds.

14. A cabinet according to claim 13, wherein the rear connector elements comprise hooks punched from the sheet metal.

15. A cabinet according to claim 14, wherein the first and second side panels comprise flanges directed towards a center line of the cabinet and extending under a bottom surface of the bottom panel.

16. A cabinet according to claim 12, further comprising guiding profiles attached to the top and bottom panels for guiding sliding doors.

17. A cabinet according to claim 12, wherein the top and bottom panels are identical units.

18. A cabinet comprising
a top panel with front corners;
a bottom panel; and
first and second side panels;
wherein,
the cabinet is adapted to be suspended from vertically oriented carrier elements, which are provided with slots;
each of the first and second side panels comprises rear connector elements for connecting to carrier element slots; and
the top panel comprises connector elements connecting front corners of the top panel to front ends of the first and second side panels;
the first and second side panels are made of sheet metal, and the rear connector elements comprise hooks punched from the sheet metal;
the top panel's connector elements comprise clips which are adapted to be attached to the top panel and cooperate with the first and second side panels; and
the first and second side panels comprise flanges directed towards a center line of the cabinet and extending under a bottom surface of the bottom panel.

19. A cabinet according to claim 18, wherein the top and bottom panels are identical units.

20. A cabinet according to claim 18, further comprising guiding profiles attached to the top and bottom panels for guiding sliding doors.

21. A cabinet according to claim 18, wherein the top panel is made of sheet metal and reinforced with a board.

* * * * *